Figure 1:
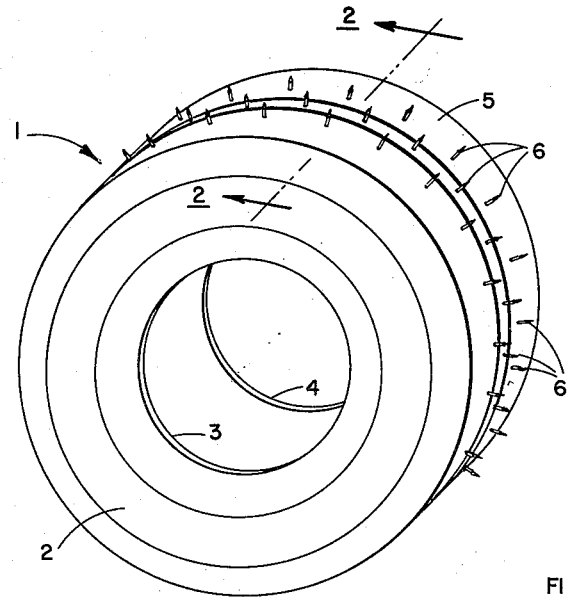

July 23, 1963     T. P. VASILJEVIC     3,098,516
TIRE TRACTION ARRANGEMENT

Filed Feb. 19, 1962     2 Sheets-Sheet 1

*INVENTOR.*
TOMISLAV P. VASILJEVIC
BY
ATTORNEY

July 23, 1963 T. P. VASILJEVIC 3,098,516
TIRE TRACTION ARRANGEMENT
Filed Feb. 19, 1962 2 Sheets-Sheet 2

INVENTOR.
TOMISLAV P. VASILJEVIC
BY
*Richard F. Carr*
ATTORNEY

United States Patent Office 3,098,516
Patented July 23, 1963

3,098,516
TIRE TRACTION ARRANGEMENT
Tomislav P. Vasiljevic, 607 S. Glen St.,
Anchorage, Alaska
Filed Feb. 19, 1962, Ser. No. 174,007
8 Claims. (Cl. 152—210)

This invention pertains to a design for providing improved traction for vehicle wheels.

Motorists have long been plagued by the problem of wheel slippage on snow and ice as well as on other surfaces where traction is poor. Not only does it become difficult to propel the vehicle as the driving wheels spin, but also the vehicle cannot be steered or controlled properly. The consequent hazardous driving is familiar to most motorists.

In an effort to alleviate this, chains have been applied to the periphery of the tire in order to give added traction. While some improvement is realized by this expedient, the results are far from ideal. Installation of the chains is a time-consuming and troublesome task. Furthermore, the chains wear out rapidly and are easily broken. The result is that loose pieces of the chain will strike against the underside of the car, frequently causing damage. Moreover, chains will not afford the desired traction under certain adverse conditions.

Alternatively, many motorists have resorted to the use of snow tires which are provided with a tread particularly adapted for gripping a surface of snow. With the tread being rubber, however, snow tires give even less traction than do chains. They will not dig into an icy surface and accordingly are limited in the improvement they provide. Hence, there has been no fully satisfactory answer to the problem of driving on snow or ice or under other conditions where the terrain is slippery.

The design of this invention overcomes the difficulties of the prior art, providing positive traction under even the most extreme conditions. This is accomplished by a plurality of spikes projecting radially outward from the pheriphery of the tire. Each spike is retained within a sleeve secured in the body of the tire. The sleeves, in turn, are held in alignment by means of reinforcing wires joining them together. Each spike has a head at its inner end which contacts a soft shock liner that holds the spike in place when the tire is deflated and protects the adjacent tire surface. As the spikes become worn, they can be removed and replaced so that the necessary gripping action always is obtainable. In one embodiment, the traction elements are incorporated in the structure of the tire, while in another version of the invention a separate assembly is applied over the outer surface of a conventional tire when improved traction is to be obtained.

Therefore, it is an object of this invention to provide an arrangement giving positive traction for vehicle wheels under virtually all operating conditions.

Another object of this invention is to provide a tire traction arrangement having projecting elements that will dig into and grip snow, ice, mud or other surfaces encountered.

A further object of this invention is to provide a traction improving device having outwardly projecting elements that are readily replaceable when worn.

An additional object of this invention is to provide a traction device that can provide projecting elements of a variety of different shapes.

Yet another object of this invention is to provide an arrangement whereby gripping members can be applied to a pneumatic tire when needed, and removed when not required.

Figure 3:
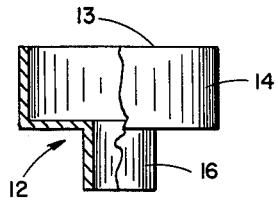
Figure 4:
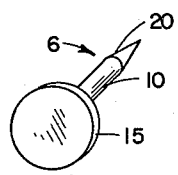
Figure 5:
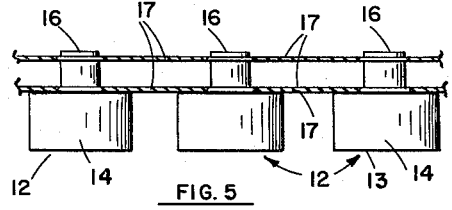
Figure 2:
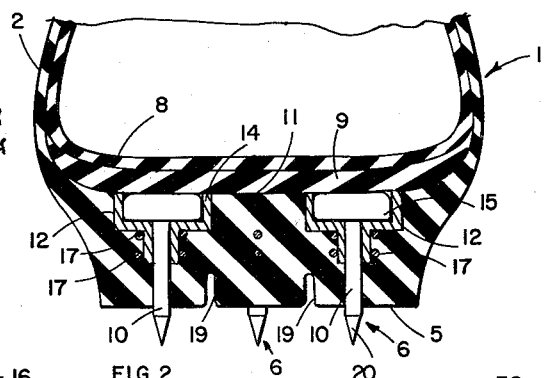
Figure 6:
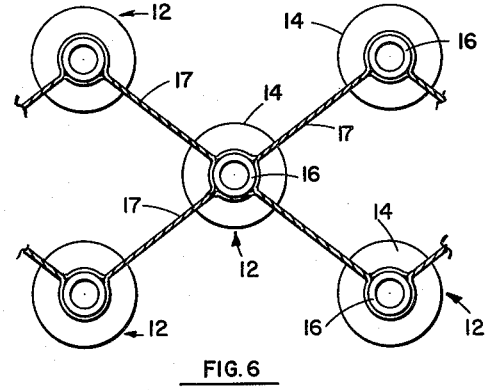
Figure 12:
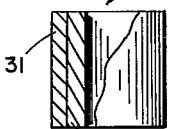
Figure 11:
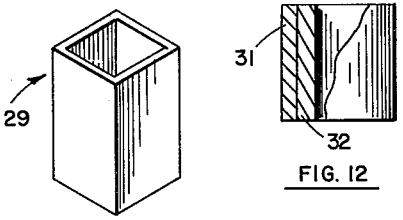
Figure 13:
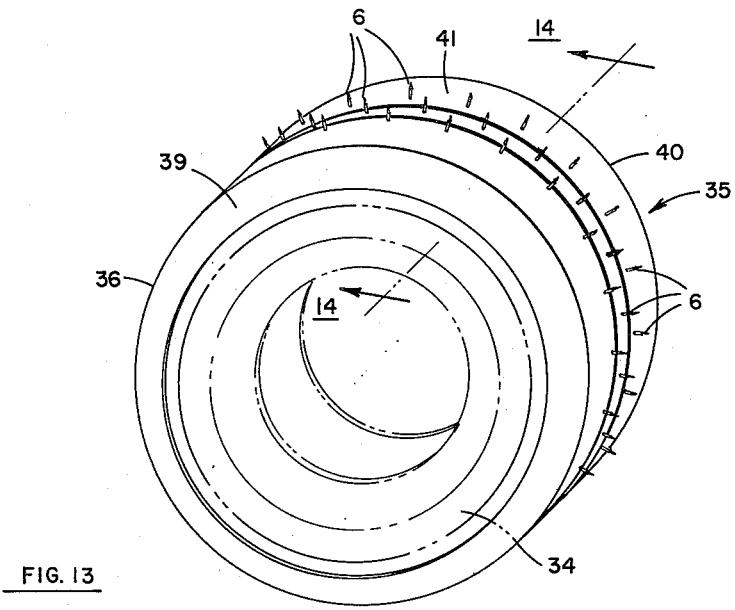
Figure 14:
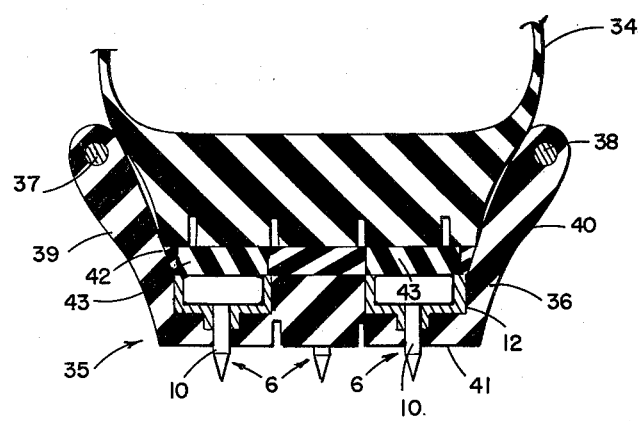
Figure 7:
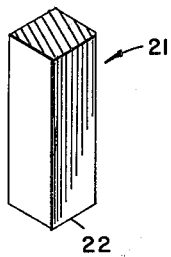
Figure 8:
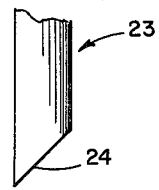

These and other objects will become apparent from the following detailed description taken in connection with the accompanying drawing in which:

FIG. 1 is a perspective view of a tire incorporating the traction improving arrangement of this invention, FIG. 2 is a fragmentary transverse sectional view taken along line 2—2 of FIG. 1 illustrating the manner in which the friction elements are retained by the tire, FIG. 3 is an enlarged elevational view, partially in section, showing one of the retaining sleeves for the friction elements, FIG. 4 is a perspective view of one of the friction elements removed from the retainer, FIG. 5 is a side elevational view of several retainer sleeves illustrating the manner in which they are secured together by wires to maintain the sleeves in proper alignment, FIG. 6 is a plan view of the arrangement of FIG. 5, FIGS. 7 and 8 are enlarged fragmentary views of modified gripping members, FIGS. 9, 10, 11 and 12 are enlarged views of different configurations of the retainer sleeves, FIG. 13 is a perspective view, similar to FIG. 1, but illustrating a modified form of the invention in which the traction improving arrangement is included in a separate assembly applied over the periphery of a conventional tire, and FIG. 14 is an enlarged fragmentary transverse sectional view taken along line 14—14 of FIG. 13.

With reference to the drawing, and in particular to FIGS. 1 and 2, there may be seen a pneumatic tire 1 conventional in that it includes a sidewall 2 and inner beads 3 and 4 adapted for association with a wheel rim in the usual manner. It is constructed predominately of an elastomer such as rubber and includes a reinforcing cord structure embedded therein. However, from the outer circumferential surface 5 of the tire 1 there projects a plurality of spike elements 6. It is these members that are utilized in providing the gripping action with the surface beneath the wheel so that improved traction results.

As illustrated, the tire is of the tube type having an inner tube 8 to be pressurized with air. Between the tube 8 and the tire casing 1 is a pad 9 of soft material extending around the outer periphery of the tube. This liner may be of a resilient rubber material. Where a tubeless tire is to be provided, the edges of liner 9 are bonded to the adjacent casing surface so that the inner tube 8 may be omitted.

Outward of the element 9 the casing 1 is provided with spaced radial apertures to receive the shanks 10 of the spike elements 6. In addition, the casing includes recesses in its inner surface 11 to hold the retainers 12 for the spikes. These retainers may be cup-shaped sleeve members, as seen in FIG. 2 and in the enlarged illustration of FIG. 3, having open inner ends 13 that are positioned adjacent the liner pad 9. Each retainer has an enlarged section 14 that receives the head 15 of the spike element 6. The inner end portion of the spike shank 10 passes through the smaller cylindrical portion 16 of the retainer. The retainers 12 may be integrally bonded to the material of the tire casing 1, and spaced evenly about the periphery of the tire. In addition, in order to maintain proper alignment, the retainers 12 are held by wires 17 that interconnect the retainer sleeves. These wires are wrapped around each of the retainers and by extending from one retainer to the other form a network within the rubber of the tire casing that assists in positioning the retainers and holding them in their proper positions to direct the spike elements 6 radially outward of the tire. In the arrangement of FIGS. 5 and 6, the wires are in the form of flexible woven cables unraveled to pass around and secure the portions 16 of the retainers 12.

It can be seen from the foregoing, therefore, that with the spike elements 6 in position and extending outwardly of the tire surface 5, vastly improved traction is obtained.

Spike elements readily can dig into any surface encountered and will provide positive traction even on ice. Moreover, the spikes are evenly spaced, leaving no gaps on the tire surface where traction can be lost. The relatively wide flat head portion 15 of each spike distributes the inwardly directed load imposed upon the shank of the spike. The resilient pad 9 protects the inner tube of the tire and enhances the resilient effect of the spike members as the tire rotates. The spikes are permitted a certain amount of radial movement inward and outward with respect to the casing, depending upon the surface encountered by the spikes and the internal pressure in the tire. Therefore, by varying the inflation pressure of the tire, the spikes can be made to have either more or less yield and thus can be adjusted to give optimum characteristics for the particular terrain encountered.

By being received in the sleeve elements 12 and not themselves secured to the material of the tire casing, the spike members 6 are removable and can be replaced when worn. This is accomplished merely by deflating the tire, removing the tube 8 and the liner 9, and slipping the spike members out through the inner surface of the tire casing. This also is done during warm weather or other times when slippery terrain will not be encountered. A tread design is included on the outer surface 5, as provided by grooves 19, so that the tire is as usable on dry pavement as it is in snow and ice.

As a result, the design of this invention provides maximum flexibility, permitting the tire to be used under any type of operating conditions yet assuring that proper gripping action can be obtained whenever needed.

Although as shown in FIGS. 2 and 4 the spike elements have sharp pointed ends 20, other configurations may be utilized as desired. While under one type of conditions the pointed shape will give maximum advantage, in other instances the friction element may operate more satisfactorily with a different design. This may be the square-shaped element 21 of FIG. 7 that has a flat end surface 22. In other situations the spike 23 of FIG. 8 may be preferred, this unit having a beveled end face 24. In other words, many different configurations may be given the spike elements used in connection with this invention in assuring that optimum results are obtained.

Figure 9:
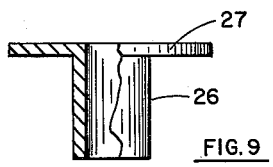

Similarly, the retainers for the spikes may be varied from the designs of FIGS. 2 and 3. For example, as seen in FIG. 9, the retainer has a tubular section 26 connecting to a radial end flange 27. In this design the head 15 of the spike member will engage the outer face of the flange 27, while the shank 10 extends through the tubular section 26. Of course, the inner circumferential wall of the tire casing will be recessed to provide clearance for the head of the spike member 6.

Figure 10:
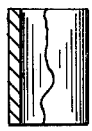

Another configuration may be seen in FIG. 10 where the retainer 28 is merely a straight tubular member one edge of which is to be engaged by the inner surface of the head 15 of the spike 6. The retainer sleeve 29 of FIG. 11, which is of square cross section, may be used with the square pin 21 of FIG. 7.

Wear of the retainer can be compensated for in the arrangement of FIG. 12. Here the retainer 30 is made up of a duality of concentric tubular elements 31 and 32. The latter is substantially complementary to the outer sleeve 31, but may be slid out and removed when desired. Therefore, if during operation of the device of this invention the spike causes the inner sleeve 32 to wear excessively, the inner element simply is removed and replaced. When this construction is used, therefore, the retainer sleeve is renewable just as are the friction elements 6. The outer sleeve 31 of course is engaged and secured to the tire casing in the usual manner.

In the embodiment of FIGS. 13 and 14, the design of this invention may be used in connection with a conventional tire 34. In this connection there is provided a separate assembly 35 that fits around the outer portion of the tire 34 to provide the improved traction when needed. The unit 35 includes a body 36 which may be somewhat similar to a tire casing, including cord reinforcement within the rubber structure. This unit is of substantially U-shaped cross section dimensioned to fit over the outer tread portions of the tire 34. Cables 37 and 38 are included at the distal ends of the inwardly projecting sidewall portions 39 and 40 of the body element 36, providing the unit with proper strength and rigidity. The outer wall 41 of the element 36 is provided with openings, as in the previously described embodiment, for receiving spike retainers 12 and the spike elements 6, or their alternate parts.

Instead of the liner pad 9, however, there is included along the inner surface of the peripheral section 41 a circumferential sheet 42 of relatively unyieldable material. This may be a hard rubber. The member 42 is interposed between the wall 41 of the body section 36 and the outer circumferential surface of the tire 34. The member 42 is provided with a circular opening at the location of each of the spike retainers 12. Within each opening is a separate resilient, shock absorbing, soft pad 43. These pads, therefore, provide resilience to allow a certain amount of inward movement of the spikes 6, while also protecting the outer surface of the tire 34.

Thus the unit of FIGS. 13 and 14 operates substantially as the previously described embodiment, but is applicable for use with conventional tires. Preferably, it is constructed so that the internal diameter of the assembly 35 is slightly less than the outside diameter of the tire 34. This permits the unit to be secured in place without the use of auxiliary straps or other retaining devices. Installation is accomplished easily by deflating the tire 34 sufficiently so that the assembly 35 can be slipped over the outer circumference of the tire. When the tire is inflated subsequently, it expands outwardly against the assembly 35, firmly holding it in place. The cables give the traction unit rigidity under these conditions, and it will not tend to roll off the tire, nor will it slip rotationally as the wheel turns. As before, the improved traction of the spike elements is realized, while the advantage of replaceability of the friction members is retained. Again, the configuration of the spikes may be altered to suit conditions, and the retainer sleeves also may have a variety of designs.

The foregoing detailed description is to be clearly understood as given by way of illustration and example only, the spirit and scope of this invention being limited solely by the appended claims.

I claim:

1. In combination with a pneumatic tire having an outer circumferential surface and sidewalls extending inwardly therefrom, a traction-improving device for said tire comprising
   an annular member having an outer wall circumscribing said outer circumferential surface of said tire,
      said annular member having sidewall portions extending inwardly of said outer wall,
   a cable annularly arranged in each of said sidewall portions of said annular member,
      said outer wall having a plurality of openings therethrough,
   a sleeve member in each of said openings,
   an elongated element in each of said sleeves and projecting outwardly beyond said outer wall for gripping media traversed by said annular member,
   a liner interposed between said outer circumferential surface of said tire and said outer wall of said tire,
      said liner including resilient pad means adjacent the inner end of each of said elongated members,
   and filamentous means in said outer wall interconnecting and retaining said sleeves.

2. A device as recited in claim 1 in which said liner comprises an annular sheet of a relatively
   hard elastomer,
      said sheet including spaced apertures therein
         aligned with said elongated members,
said resilient pad means comprising a discrete element
   of a relatively soft elastomer in each of said apertures.
3. A traction tire comprising
a casing member having an outer circumferential wall,
a plurality of sleeves embedded in said wall,
      said sleeves being in a spaced relationship with
         each other and having substantially radially
         arranged axial openings therethrough,
      said sleeves extending from the inner surface of
         said wall a radial distance less than the thick-
         ness of said wall,
      said wall having a plurality of radial openings
         forming extensions of said openings in said
         sleeves,
            whereby there is a communication between
               the inner and outer surfaces of said wall,
a traction member for each of said sleeves,
   each traction member having a substantially flat
      head portion substantially flush with said inner
      surface of said wall,
   and a shank slidably extending through the sleeve
      with which it is associated and through the open-
      ing in said wall extending from said sleeve and
      projecting outwardly from the outer surface of
      said wall
         for thereby providing a projected element
            adapted to grip an adjacent surface,
an annular resilient member in juxtaposition with said
   inner surface,
filamentous means embedded in said wall and engaging
   said sleeves for retaining said sleeves in position,
and pneumatic means inwardly of said annular mem-
   ber for retaining pressurized air and biasing said
   circumferential wall, annular member, and traction
   members outwardly.
4. A traction-improving device for a wheel comprising
an annular member of predominately elastomeric ma-
   terial,
      said annular member having an outer wall pro-
         vided with an outer and an inner circumferential
         surface,
            said outer surface being adapted to engage
               the media to be traversed by a wheel,
            said annular member having a plurality of
               spaced substantially radial apertures there-
               through extending between said outer and
               inner surfaces,
a sleeve in each of said apertures,
   each of said sleeves including a duality of con-
      centrically arranged elements,
         the outer one of which engages said elasto-
            meric material and is secured thereto,
         the inner concentric element being comple-
            mentary to said outer element and remova-
            bly received within the outer element,
a spike removably received in each of said sleeves
   extending through the aperture thereof and outwardly
   beyond said outer circumferential surface,
      whereby said spikes provide projecting elements
         for gripping said media to be traversed by said
         wheel,
            each of said spikes including a head adjacent
               said inner circumferential surface,
a resilient member adjacent the inner face of each of
   said heads for thereby resiliently absorbing loads im-
   posed upon said spikes,
and filamentous means embedded in said annular mem-
   ber and interconnecting said sleeves for assisting in
   maintaining alignment thereof.
5. A traction-improving device for a wheel comprising
an annular member of predominately elastomeric ma-
   terial,
      said annular member having an outer wall pro-
         vided with an outer and an inner circumferential
         surface,
            said outer surface being adapted to engage
               the media to be traversed by a wheel,
            said annular member having a plurality of
               spaced substantially radial apertures there-
               through extending between said outer and
               inner surfaces,
a sleeve in each of said apertures,
a spike removably received in each of said sleeves
   extending through the aperture thereof and outwardly
   beyond said outer circumferential surface,
      whereby said spikes provide projecting elements
         for gripping said media to be traversed by said
         wheel,
            each of said spikes including a head adjacent
               said inner circumferential surface,
a resilient member adjacent the inner face of each of
   said heads for thereby resiliently absorbing loads im-
   posed upon said spikes,
      said resilient member including an individual pad
         adjacent said outer face of the head of each
         of said spikes,
a second annular member of relatively harder material,
   said second annular member having apertures
      therethrough substantially complementarily re-
      ceiving said individual pads,
and filamentous means embedded in said first men-
   tioned annular member and interconnecting said
   sleeves for assisting in maintaining alignment thereof.
6. A device for enabling a wheel to grip an adjacent
surface comprising
a casing member having an outer circumferential wall,
   said wall having a plurality of substantially ra-
      dially arranged openings therethrough extend-
      ing from the inner surface of said wall to the
      outer surface thereof,
sleeve means in each of said openings,
   said openings being of greater length than the
      length of said sleeve means,
filamentous means embedded in said wall and con-
   nected to said sleeve means for retaining said sleeve
   means in position,
a traction member in each of said sleeves,
   each traction member having a head adjacent said
      inner surface of said wall,
   and a shank slidably extending through said sleeve
      means and the corresponding opening in said
      wall,
   said shanks projecting outwardly from said outer
      surface of said wall for thereby providing a pro-
      jected element adapted to grip an adjacent
      surface,
a resilient member adjacent the inner end of each of
   said traction members
      and in juxtaposition with said inner surface of
         said wall,
and pneumatic means inwardly of said resilient mem-
   ber for retaining pressurized air and biasing said cir-
   cumferential wall, resilient member and traction
   members outwardly.
7. A device as recited in claim 6 in which
each of said sleeve means includes a radially enlarged
   portion adjacent said inner surface of said circum-
   ferential wall,
and each of said traction members includes a radially
   enlarged head portion engaging said radially enlarged
   portion of said sleeve means.
8. A device as recited in claim 7 in which said ra-
dially enlarged portion of said sleeve means includes a
recess therein receiving said head of said traction member so that said traction members at the inner ends thereof are substantially flush with said inner surface of said circumferential wall.

References Cited in the file of this patent

UNITED STATES PATENTS

| | | |
|---|---|---|
| 1,019,973 | Lieb | Mar. 12, 1912 |
| 1,422,290 | Moriarty | July 11, 1922 |
| 1,487,623 | Thompson | Mar. 18, 1924 |
| 1,568,581 | Albert | Jan. 5, 1926 |
| 2,524,551 | Tolbert | Oct. 3, 1950 |
| 2,535,299 | Leach et al. | Dec. 26, 1950 |
| 2,627,888 | Bull | Feb. 10, 1953 |
| 2,888,057 | Hildebrant | May 26, 1959 |
| 2,904,093 | Kroon | Sept. 15, 1959 |
| 2,982,325 | Pellaton | May 2, 1961 |